United States Patent
Kooy

(10) Patent No.: US 7,765,523 B2
(45) Date of Patent: Jul. 27, 2010

(54) SYSTEM AND METHOD FOR GENERATING A WEB-ENABLED GRAPHICAL USER INTERFACE PLUG-IN

(75) Inventor: Darrell Kooy, Aurora, IL (US)

(73) Assignee: Computer Associates Think, Inc., Islandia, NY (US)

(*) Notice: Subject to any disclaimer, the term of this patent is extended or adjusted under 35 U.S.C. 154(b) by 1174 days.

(21) Appl. No.: 10/887,791

(22) Filed: Jul. 9, 2004

(65) Prior Publication Data

US 2005/0044526 A1 Feb. 24, 2005

Related U.S. Application Data

(60) Provisional application No. 60/486,169, filed on Jul. 10, 2003.

(51) Int. Cl.
G06F 9/44 (2006.01)
G06F 17/00 (2006.01)
(52) U.S. Cl. ............... 717/106; 717/107; 717/108; 717/109; 715/234
(58) Field of Classification Search ............... 717/107, 717/109
See application file for complete search history.

(56) References Cited

U.S. PATENT DOCUMENTS

| | | | |
|---|---|---|---|
| 5,335,320 A | 8/1994 | Iwata et al. ............... 717/110 |
| 5,347,629 A | 9/1994 | Barrett et al. | |
| 5,909,214 A | 6/1999 | Consolatti et al. ........... 715/764 |
| 5,940,075 A | 8/1999 | Mutschler, III et al. ..... 715/760 |
| 5,956,029 A * | 9/1999 | Okada et al. ............... 715/746 |
| 5,974,430 A | 10/1999 | Mutschler, III et al. ..... 715/207 |
| 6,003,047 A | 12/1999 | Osmond et al. ............ 715/210 |
| 6,005,568 A | 12/1999 | Simonoff et al. | |
| 6,115,040 A | 9/2000 | Bladow et al. .............. 715/741 |
| 6,157,936 A | 12/2000 | Mutschler, III et al. ..... 715/207 |
| 6,173,316 B1 | 1/2001 | De Boor et al. ............. 709/218 |
| 6,177,941 B1 | 1/2001 | Haynes et al. .............. 715/810 |
| 6,212,535 B1 * | 4/2001 | Weikart et al. .............. 715/207 |
| 6,222,537 B1 | 4/2001 | Smith et al. ................ 715/762 |
| 6,249,844 B1 | 6/2001 | Schloss et al. ............. 711/122 |
| 6,266,681 B1 | 7/2001 | Guthrie .................. 715/501.1 |
| 6,275,226 B1 | 8/2001 | Uchida et al. ............... 715/744 |

(Continued)

FOREIGN PATENT DOCUMENTS

EP 0622729 11/1994

(Continued)

OTHER PUBLICATIONS

Object Technology International, "Eclipse Platform Technical Overview," Jul. 2001.*

(Continued)

*Primary Examiner*—Insun Kang
(74) *Attorney, Agent, or Firm*—Pillsbury Winthrop Shaw Pittman LLP

(57) ABSTRACT

A method for generating a web-enabled graphical user interface plug-in includes loading a resource script file for a windowed software application. At least one GUI plug-in is automatically generated based, at least in part, on the resource script file. Each GUI plug-in is operable to present at least a portion of the software application in a web-enabled format.

24 Claims, 4 Drawing Sheets

U.S. PATENT DOCUMENTS

| | | | |
|---|---|---|---|
| 6,300,947 B1 | 10/2001 | Kanevsky | 345/333 |
| 6,323,884 B1 | 11/2001 | Bird et al. | 715/810 |
| 6,342,907 B1 | 1/2002 | Petty et al. | |
| 6,430,556 B1* | 8/2002 | Goldberg et al. | 707/4 |
| 6,456,307 B1 | 9/2002 | Bates et al. | 345/838 |
| 6,476,828 B1 | 11/2002 | Burkett et al. | 715/760 |
| 6,532,463 B1 | 3/2003 | Robbins et al. | 707/9 |
| 6,628,305 B1* | 9/2003 | Hong et al. | 715/734 |
| 6,701,383 B1* | 3/2004 | Wason et al. | 719/328 |
| 6,701,513 B1 | 3/2004 | Bailey | 717/109 |
| 6,802,053 B1 | 10/2004 | Dye et al. | 717/113 |
| 6,961,750 B1 | 11/2005 | Burd et al. | 709/203 |
| 7,065,744 B2* | 6/2006 | Barker et al. | 717/109 |
| 7,069,553 B2* | 6/2006 | Narayanaswamy et al. | 717/173 |
| 7,124,398 B2 | 10/2006 | Chen et al. | 717/106 |
| 7,143,359 B2 | 11/2006 | Aggarwal et al. | 715/760 |
| 7,159,183 B1 | 1/2007 | Kudukoli et al. | 715/752 |
| 7,191,404 B2* | 3/2007 | Barker et al. | 715/760 |
| 7,216,298 B1* | 5/2007 | Ballard et al. | 715/760 |
| 7,219,305 B2* | 5/2007 | Jennings | 715/761 |
| 2001/0032220 A1* | 10/2001 | Ven Hoff | 707/513 |
| 2002/0049867 A1* | 4/2002 | Kumagai | 709/319 |
| 2002/0063734 A1 | 5/2002 | Khalfay et al. | 715/744 |
| 2002/0085020 A1* | 7/2002 | Carroll, Jr. | 345/700 |
| 2002/0101448 A1* | 8/2002 | Sanderson | 345/762 |
| 2002/0109718 A1 | 8/2002 | Mansour et al. | 715/744 |
| 2002/0149619 A1 | 10/2002 | Sauer | 345/762 |
| 2002/0152244 A1* | 10/2002 | Dean et al. | 707/530 |
| 2002/0188633 A1 | 12/2002 | Davis et al. | 707/513 |
| 2003/0025732 A1 | 2/2003 | Prichard | 715/765 |
| 2003/0160822 A1* | 8/2003 | Belz et al. | 345/762 |
| 2003/0193521 A1 | 10/2003 | Chen et al. | 715/762 |
| 2004/0001092 A1* | 1/2004 | Rothwein et al. | 345/763 |
| 2004/0021688 A1* | 2/2004 | Phillips | 345/762 |
| 2004/0061713 A1* | 4/2004 | Jennings | 345/700 |
| 2004/0168121 A1 | 8/2004 | Matz | 715/513 |
| 2004/0205571 A1 | 10/2004 | Adler et al. | 715/513 |
| 2005/0010877 A1 | 1/2005 | Udler | 715/826 |
| 2005/0010901 A1 | 1/2005 | Udler | 717/109 |
| 2005/0262517 A1 | 11/2005 | French | 719/316 |
| 2006/0129982 A1* | 6/2006 | Doyle | 717/115 |

FOREIGN PATENT DOCUMENTS

| | | |
|---|---|---|
| WO | WO 00/29950 | 5/2000 |
| WO | WO 02/44897 | 6/2002 |

OTHER PUBLICATIONS

Marc Abrams & Contantinos Phanouriou; "UIML: An XML Language for Building Device-Independent User Interfaces"; XML Conference Proceedings, Proceedings of XML; Dec. 1999; pp. 1-15.

Firoozye, R.; "A Cross-Platform Plug-In Toolkit—Creating Dynamically Extendable Applications"; Dr. Dobbs Journal; Redwood City, CA, USA; vol. 18, No. 6; Jun. 1993; pp. 120-134.

Anonymous; "Plug-In Guide"; 1998; pp. 1-32.

Anonymous; "Plug-In Guide, Chapter I—Plug-In Basics"; HTTP://Developer.netscape.com/docs/manuals/communicator/plugindex.htm; Jan. 15, 1997; pp. 1-19.

Anonymous; "Introduction to a XUL Document"; Jun. 30, 1999.

PCT International Search Report issued in International Application No. PCT/US2004/021833; Jun. 17, 2005; 7 pages.

International Business Machines Corporation; "Multi-Modal Data Access"; Research Disclosure; Kenneth Mason Publications; Westbourne, GB, vol. 426, No. 114; Oct. 1999.

International Search Report dated May 27, 2005 issued in counterpart International Application No. PCT/US2004/021901; 7 pages.

International Search Report issued in International Application No. PCT/US2004/021969, Sep. 12, 2005, 7 pages.

International Search Report issued in International Application No. PCT/US2005/017010; Sep. 2, 2005; 6 pages.

\* cited by examiner

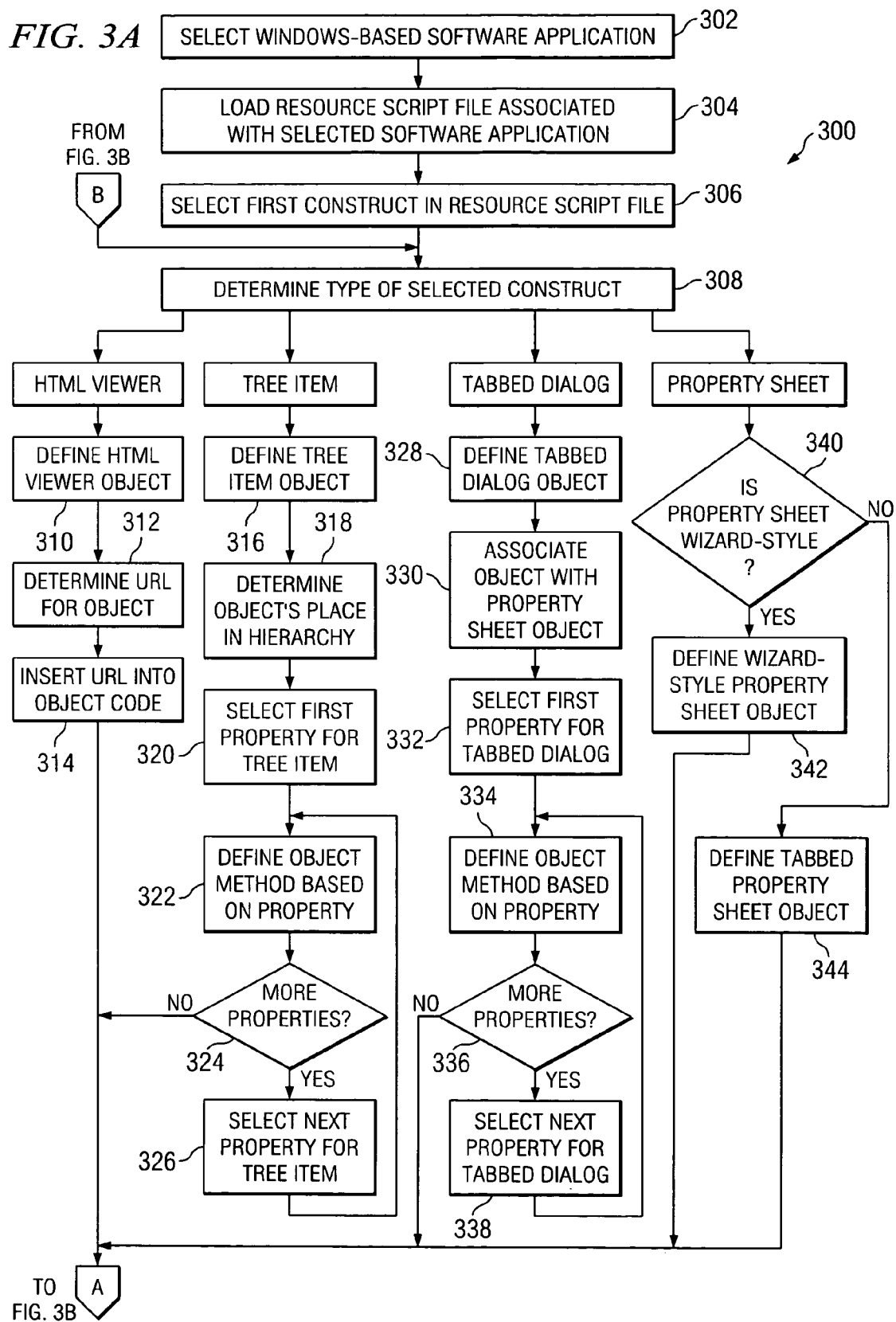

SYSTEM AND METHOD FOR GENERATING A WEB-ENABLED GRAPHICAL USER INTERFACE PLUG-IN

RELATED APPLICATION

This application claims the priority under 35 U.S.C. §119 of provisional application Ser. No. 60/486,169 filed Jul. 10, 2003.

TECHNICAL FIELD

This disclosure relates generally to the field of computer systems and, more particularly, to a system and method for generating a web-enabled graphical user interface plug-in.

BACKGROUND

A graphical user interface (GUI) provides a front-end of a windowed software application to a client. Conventional Windows-based applications present a single format of a user interface to the client and normally are only compatible with certain Windows-based operating systems. These traditional user interfaces must be redesigned and often manually recoded to provide a different software front-end or to be compatible with other operating systems such as Unix, Linux, and others.

SUMMARY

This disclosure provides a system and method for generating a web-enabled graphical user interface plug-in. In one embodiment, a method includes loading a resource script file for a windowed software application. At least one GUI plug-in is automatically generated based, at least in part, on the resource script file. Each GUI plug-in is operable to present at least a portion of the software application in a web-enabled format. In particular embodiments, the web-enabled format comprises a non-specific format operable to be executed on non-Windows-based operating systems. Other features, objects, and advantages of the invention will be apparent from the description and drawings, and from the claims. The details of one or more embodiments of the disclosure are set forth in the accompanying drawings and the description below. Particular features, objects, and advantages of the disclosure will be apparent from the description and drawings and from the claims.

DESCRIPTION OF DRAWINGS

FIGS. 3A-B are exemplary flow diagrams illustrating an example method for generating a web-enabled graphical user interface plug-in according to one embodiment of this disclosure.

DETAILED DESCRIPTION

Figure 1:
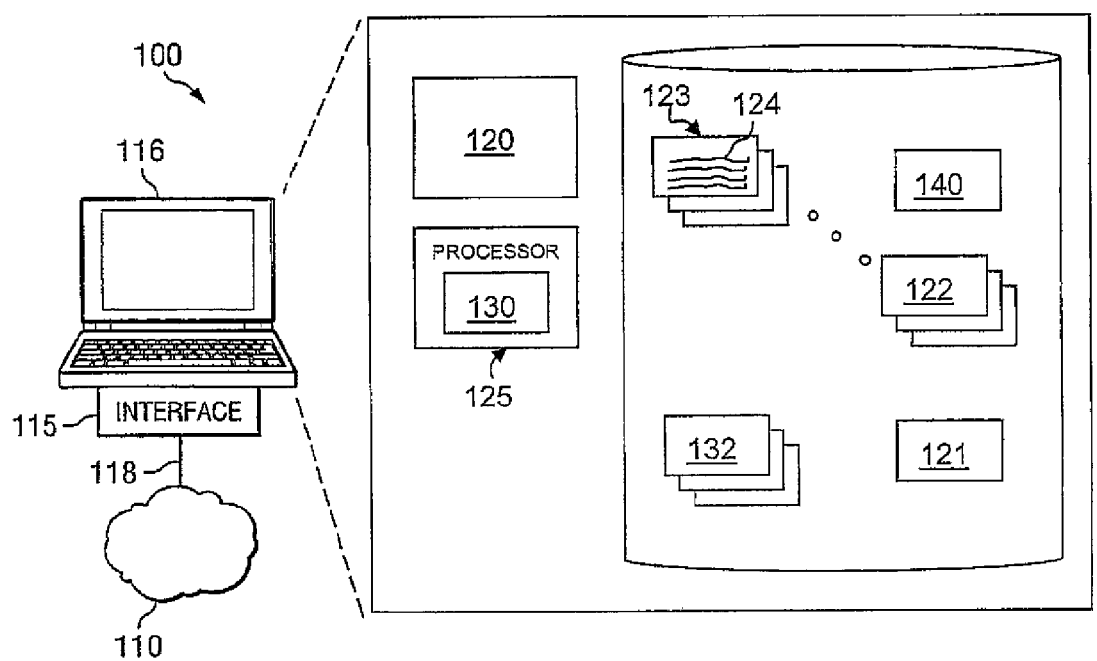
FIG. 1 is an exemplary block diagram illustrating an example system for generating a web-enabled graphical user interface plug-in according to one embodiment of this disclosure.

FIG. 1 illustrates a computing system 100 for generating a web-enabled graphical user interface plug-in from a Windows-based software application. In general, computer 100 may comprise a portion of an information management system or enterprise network that provides a number of software applications 122 to any number of clients. According to one embodiment, the software applications 122 are designed to run on Windows-based or other windowed operating systems loaded on client systems. But it will be understood that other operating systems are within the scope of this disclosure, so long as each operating system is compatible with resource script file 123. As used herein, the term "Windows-based" includes any MICROSOFT WINDOWS, WINDOWS-compatible, or WINDOWS-based software application, device, or operating system.

Computer 100 includes memory 120 and processor 125. In one embodiment, computer 100 includes a registry 121 of a Windows-based operating system, one or more software applications 122, resource scripts files 123, plug-in generation engine 130, GUI plug-ins 132, and generation table 140 that may be stored in memory 120 and may be executed or processed by processor 125. FIG. 1 only provides one example of a computer that may be used with the disclosure. The present disclosure contemplates computers other than general purpose computers as well as computers without conventional operating systems. As used in this document, the term "computer" is intended to encompass a personal computer, workstation, network computer, or any other suitable processing device. Further, "computer" and "user of computer" may be used interchangeably without departing from the scope of this disclosure. While described as executing Microsoft Windows™, computer system 100 may be adapted to execute any operating system including UNIX, Linux, or any other operating system as appropriate.

Computer 100 may also include an interface 115 for communicating with other computer systems over network 110 such as, for example, in a client-server or other distributed environment. In certain embodiments, computer 100 generates GUI plug-ins 132 and communicates it to a server or another computer system via network 110. Network 110 facilitates wireless or wireline communication between computer system 100 and any other computer. Network 110 may communicate, for example, Internet Protocol (IP) packets, Frame Relay frames, Asynchronous Transfer Mode (ATM) cells, voice, video, data, and other suitable information between network addresses. Network 110 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 115 comprises logic encoded in software and/or hardware in a suitable combination and operable to communicate with network 110 via link 118. More specifically, interface 115 may comprise software supporting one or more communications protocols associated with link 118 and communications network 110 hardware operable to communicate physical signals.

Computer 100 further comprises a graphical user interface (GUI) 116 that at least provides a front-end for plug-in generation engine 130. GUI 116 comprises a graphical user interface operable to allow the user of computer 100 to interact with plug-in generation engine 130. Generally, GUI 116 provides the user of computer 100 with an efficient and user-friendly presentation of data provided by computer 100 or network 110. GUI 116 may comprise a plurality of displays having interactive fields, pull-down lists, and buttons operated by the user. In one example, GUI 116 presents an explorer-type interface and receives commands from the user. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in computer 100 and efficiently presents the information to the user. Network 110 can accept data from the user of computer 100 via the web browser (e.g., Microsoft Internet Explorer™ or Netscape Navigator™) and return the appropriate HTML, Java™, or extensible Markup Language (XML) responses.

Memory 120 may include any memory or database module and may take the form of volatile or non-volatile memory including, without limitation, a computer readable storage medium such as, magnetic media, optical media, random access memory (RAM), read-only memory (ROM), removable media, or any other suitable local or remote memory. The memory further include storage component. In the illustrated embodiment, memory 120 includes a registry 121 of a Windows-based operating system, one or more software applications 122, resource scripts files 123, GUI plug-ins 132, and generation table 140. Memory 120 may include any other data without departing from the scope of this disclosure.

Registry 121 is a hierarchical listing in operating systems similar to Windows and used to store information to configure computer 100 for one or more users, software applications 122, and various hardware devices. Registry 121 includes information that is referenced by the Windows-based operating system to adequately execute various processes such as, for example, software applications 122 installed on computer 100, the respective types of files created by each application 122, and property sheet settings for folders and icons. This information is often contained in registry entries that are logically organized into a hierarchy. Computer 100 also includes one or more software applications 122. For example, software application 122 may comprise any type of software, operable to run in any suitable environment, that includes a graphical front-end that is presented to the user based on an associated resource script file 123. It will be understood that while FIG. 1 illustrates software application 122 being stored in memory 120, computer 100 may be resident in a distributed system and remotely execute application 122 over network 110.

Resource script file 123 may comprise any file, script, executable, template, an individual resource existing as a stand-alone file such as a bitmap, icon, or cursor file, or header file that includes graphical information. For example, resource script file 123 may comprise a file with an ".rc", ".rct", ".exe", or ".dll" extension. Further, resource script file 123 may be a compilation or a logical association of multiple resource files. Resource script file 123 includes one or more graphical constructs 124, each of which typically defines a single graphical object in a Windows-based system. In one embodiment, resource script file 123 in the Windows-based operating system includes one or more of the following constructs 124: default menu definition, accelerator and string tables, default "About" dialog box, other dialog boxes, icon files, version information, bitmaps, toolbars, and HTML files.

Computer 100 generates GUI plug-in 132 based on the one or more constructs 124 stored in resource script file 123. In one embodiment, GUI plug-in 132 presents an explorer-type interface with a tree left view and a detailed panel or HTML right view. But GUI plug-in 132 could include any hardware, software, firmware, or combination thereof operable to present any graphical resource, such as a status bar, menu bar, and others, stored in resource file 123 in a web-enabled or nonspecific format. As used herein, "nonspecific" means that the user interface is operable to be presented using a generic web browser, to be executed in various Windows-based and non-Windows-based operating systems, or to be loaded by any appropriate graphical user interface framework. For example, GUI plug-in 132 may comprise a script, file, Dynamic Linked Library (DLL), ".jar" file, or any other suitable module written in any appropriate computer language such as, for example, C, C++, Java, Perl, Visual Basic™, and others. It will be understood that while GUI plug-in 132 is illustrated as a single multi-tasked module, the features and functionality performed by this plug-in may be performed by multiple modules.

In one embodiment, GUI plug-in 132 comprises Java source code and provides an explorer-type interface. In this embodiment, Java property pages may be created based on Win32 Dialog boxes in resource script file 123 and stored in GUI plug-in 132. GUI plug-in 132 often includes tree nodes or items for a left-hand side of the explorer interface. For example, plug-in generation engine 130 may define the following exemplary code to generate a tree item object:

```
TreeItem (
    ExplorerFrame parent,
    String className,
    String objectName);
```

Also, GUI plug-in 132 may include menus for the right-click of a mouse on a tree node by subclassing a menu class as described by the following example code:

```
PluginMenu (ExplorerFrame parent):
```

Call addMenuItem( ) for each menu item as in the example below.

```
void addMenuItem (
    String menuText;
    String toolTip);
```

Computer 100 may further create toolbars for the right click of the mouse on the tree node by subclassing a toolbar class as described by the following example code:

```
PluginToolBar (
    ExplorerFrame parent)
```

GUI plug-in 132 may further include a property sheet as illustrated by the following example Java constructor:

```
PropertySheet(
    ExplorerFrame parent,
    Notebook notebook,
    String className,
    String objectName,
    boolean isNewObject,
    Boolean isModal);
```

GUI plug-in 132 may also include at least one property sheet for each dialog box as illustrated by the following example Java constructor.

```
PropertyPage(
    PropertySheet propertySheet,
    ExplorerName parent,
    String helpID);
```

Another graphical item based on construct 124 is an Inclusion Page Dialog. Each Inclusion Page Dialog shows relations between objects such as, for example, users in a group or groups that a user is in.

```
InclusionPage(
    PropertySheet propertysheet,
    ExplorerFrame parent,
    String childclass,
    string title);
```

GUI plug-in 132 may present an HTML viewer in interface 116 to the user of computer 100. Accordingly, GUI plug-in 132 may comprise an HTML viewer object.

```
HtmlView(
    ExplorerFrame parent,
    Notebook notebook,
    boolean isModal);
```

Generation table 140 comprises rules, instructions, algorithms, or any other directive used by computer 100 to generate one or more GUI plug-ins 132 from resource script file 123. Table 140 may be of any suitable format including XML documents, flat files, comma-separated-value (CSV) files, SQL tables, relational database tables, and others.

Processor 125 executes instructions and manipulates data to perform the operations of computer 100, such as plug-in generation engine 130. Although FIG. 1 illustrates a single processor 125 in computer 100, multiple processors 125 may be used according to particular needs, and reference to processor 125 is meant to include multiple processors 125 where applicable. In the embodiment illustrated, computer 100 includes plug-in generation engine 130 that processes resource script file 123 and generates GUI plug-ins 132 based in part on input from the user. Plug-in generation engine 130 could include any hardware, software, firmware, or combination thereof operable to generate GUI plug-ins 132. It will be understood that while plug-in generation engine 130 is illustrated as a single multi-tasked module, the features and functionality performed by this engine may be performed by multiple modules such as, for example, a generation module and a registration module. Further, plug-in generation engine 130 may comprise a child or sub-module of another application (not illustrated) without deporting from the scope of the disclosure. In one embodiment, plug-in generation engine 130 loads and parses resource script file 123 into graphical constructs 124 and automatically generates source code for one or more GUI plug-ins 132 based on constructs 124.

In one aspect of operation, a user of computer 100 selects a Windows-based software application 122. Based on this selection, plug-in generation engine 130 loads a resource script file 123 that is associated with the selected software application 122. Plug-in generation engine 130 parses resource script file 123 into one or more constructs 124. Plug-in generation engine 130 then defines one or more object-oriented or aspect-oriented classes using the parsed constructs 124. Then, plug-in generation engine 130 inserts logic, algorithms, or code from software applications 122 into the class definition as appropriate. As described above, any appropriate computer language may be used to define the classes. Once the code is defined, plug-in generation engine 130 generates object-oriented or other similar source code and compiles the source code (when necessary) to generate GUI plug-in 132.

Figure 2:
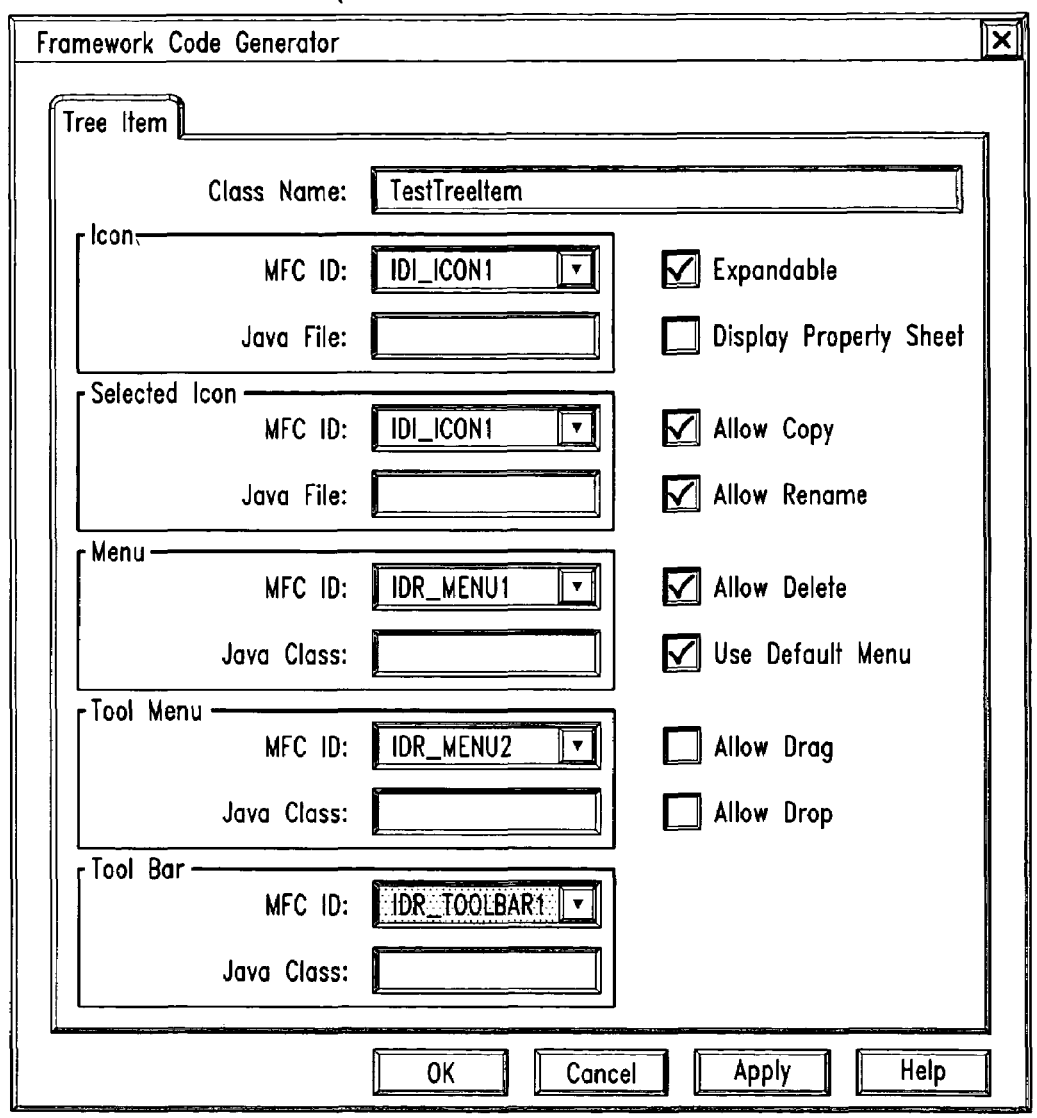
FIG. 2 is an exemplary diagram illustrating an example interface of a plug-in generation engine according to one embodiment of this disclosure.

FIG. 2 illustrates an example user interface 216 of plug-in generation engine 130 according to one embodiment of this disclosure. Generally, user interface 216 provides the user with a view of the processing of plug-in generation engine 130. More specifically, user interface 216 allows the user to customize GUI plug-in 132 during the definition and generation process. In one embodiment, user interface 216 is presented to the user through GUI 116.

In the illustrated embodiment, user interface 216 includes the definition of a tree item, or node, class prior to the generation of the actual tree item class source code. The properties and methods of the tree item class are customizable by the user through various checkboxes and text entry. For example, illustrated user interface 216 includes several check-boxes along the right side. These check-boxes might be loaded by one construct 124 prior to presentation to the user. Once the user substantially finalizes the selection, one or more methods and properties are defined for the appropriate tree item class. Example methods are illustrated below along with generic descriptions:

```
String getIcon( );
```
    Return the Icon .gif file name for the tree item.
```
String getSelectedIcon( );
```
    Return the Selected Icon .gif file name for the tree item.
```
boolean isExpandable( );
```
    Can this tree item be expanded?
```
boolean displaySheet( );
```
    Is there a property sheet associated with the tree item?
```
boolean allowCopy( );
```
    Can the tree item be copied?
```
boolean allowRename( );
```
    Can the tree item be renamed?
```
boolean allowDelete( );
```
    Can the tree item be deleted?
```
boolean expandItem( );
```
    The framework calls this method when the user expands the tree item.
```
boolean useDefaultMenu( );
```
    Display the default popup menu for the tree item?
```
boolean canDrag( );
```
    Can the tree item be dragged?
```
boolean canDrop(
    String className,
    String itemName)
```
    Can the dragged item of the class and name be dropped on this item?

It will be understood that user interface 216 is for illustration purposes only and any appropriate screen or interface, including any number of fields, may be used without departing from the scope of the disclosure. Moreover, the example methods listed above are for illustration purposes only and none, some or all of the listed methods may be implemented, as well as methods not listed.

Figure 3B:
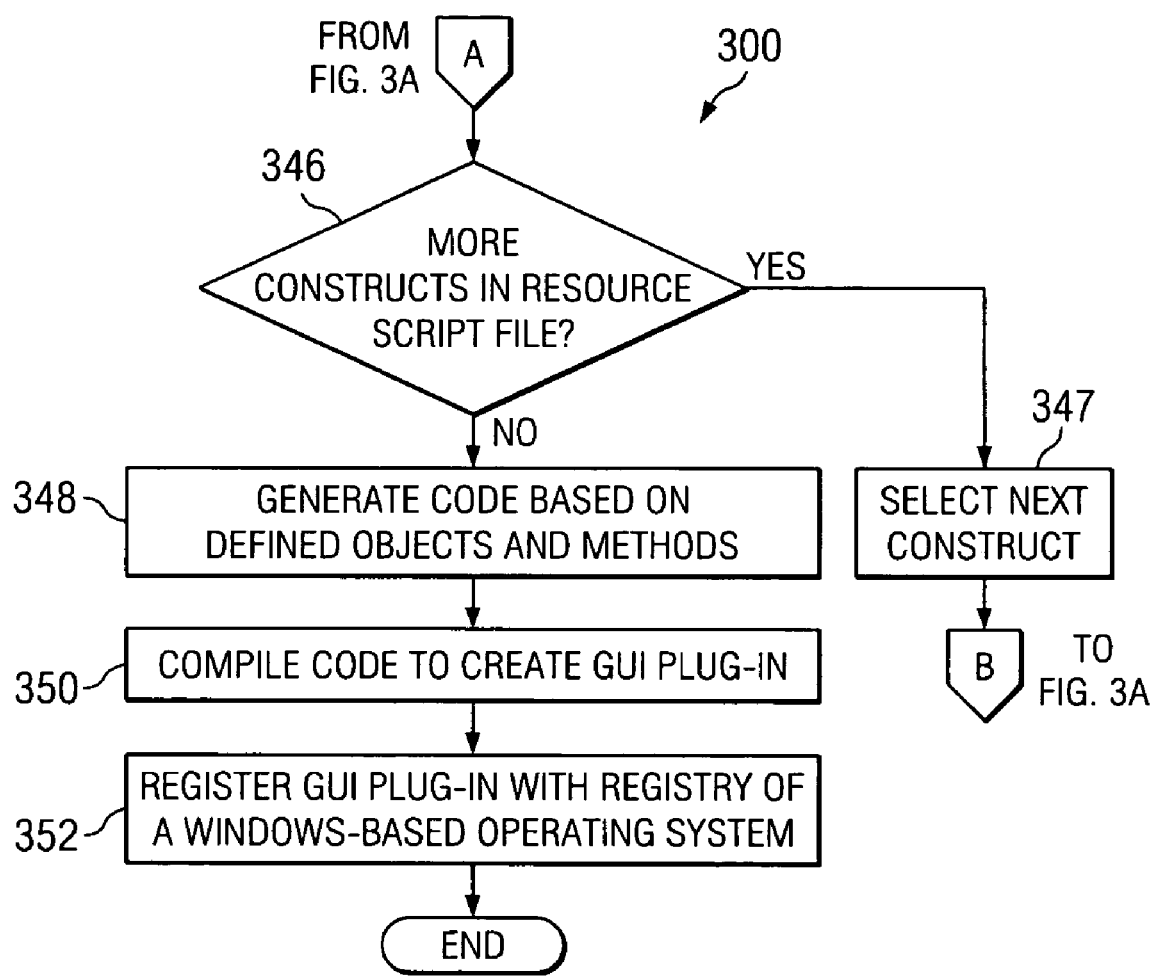

FIGS. 3A-B are exemplary flow diagrams illustrating an example method 300 for generating a web-enabled graphical user interface plug-in 132 according to one embodiment of this disclosure. Method 300 is described with respect to computer 100 of FIG. 1. But method 300 could also be used by any other system. Moreover, computer 100 may use any suitable technique for performing these tasks. Thus, many of the steps in this flowchart may take place simultaneously and/or in different orders than as shown. Moreover, computer 100 may use methods with additional steps, fewer steps, and/or different steps, so long as the methods remain appropriate.

Method 300 begins at step 302 where a particular software application 122 is selected. Plug-in generation engine 130 loads a resource script file 123 associated with the selected software application 122 at step 304. Next, at step 306, plug-in generation engine 130 selects or otherwise identifies a first construct 124 in the loaded resource script file 123. It will be understood that the selection may be performed automatically by plug-in generation engine 130 or manually by a user. Moreover, any selection of construct 124 contemplates input from the user to modify, supplement, or delete any graphical information from resource script file 123. In short, resource script file 123 may only be a starting point for the automatic generation of GUI plug-ins 132. Plug-in generation engine 130 identifies the type of the selected construct 124 at step 308. Once the type of construct 124 has been determined or otherwise identified, execution proceeds to steps 310 through 344, where each type of construct 124 is processed.

In the illustrated embodiment, construct 124 may comprise an HTML viewer, a tree item, a tab to dialogue, or a property sheet. But it will be understood that construct 124 may comprise any type of graphical information including, for example, inclusion pages, property pages, and other suitable resource script constructs. If plug-in generation engine 130 determines that example construct 124 is an HTML viewer, then plug-in generation engine 130 defines an HTML viewer object at step 310. At step 312, at least one uniform resource locator (URL) is determined for the defined object. This URL is then inserted into the object definition at step 314. If plug-in generation engine 130 determines that construct 124 is a tree item then engine 130 defines a tree item object at step 316. As described above, GUI plug-in 132 may include a tree of various items. These tree items may be logically organized into a tree hierarchy. Accordingly, at step 318, the tree item objects place is determined in the tree hierarchy. A first property is selected for the tree item at step 320. Based upon the selected property, a method is defined in the tree item object at step 322. At decisional step 324, plug-in generation engine 130 determines if there are more properties for the tree item. If there are more properties, then plug-in generation engine 130 selects the next property for the tree item at step 326 and execution returns to step 322 where the next method is defined. Otherwise, execution proceeds to step 346.

If plug-in presentation engine 130 determined that the selected construct 124 is a tabbed dialogue at step 308, the a tabbed dialogue object is created at step 328. Next, at step 330, plug-in generation engine 130 associates the created object with a property sheet object. It will be understood that the property sheet object may be created according to any appropriate technique including one illustrated by method 300 or may be a pre-existing property sheet object. Plug-in generation engine 130 then selects a first property for the tabbed dialogue at step 332. Next, at step 334, a method is created in the tabbed dialogue object based upon the selected property. At decisional step 336, plug-in generation engine 130 determines if there are more properties for the tabbed dialogue. If there are more properties for the tabbed dialogue, then the next property is selected at step 338 and execution returns to step 334. Otherwise, execution proceeds to step 346. Returning to step 308, if plug-in generation engine 130 determined that the selected construct 124 is a property sheet, then it is determined whether the property sheet is wizard-style or tabbed at decisional step 340. If the property sheet is wizard-style, then a wizard-style property sheet object is created at step 342. Otherwise a tabbed property sheet object is created at step 344. Execution then proceeds to step 346 through 352 where the remainder of resource script file 123 is processed and GUI plug-in 132 is created.

At decisional step 346, it is determined whether there are more constructs 124 in the loaded resource script file 123. As described above, the select of construct 124 contemplates any level of input from the user of computer 100. If there are more constructs, then the next construct 124 is selected in resource script file 123 at step 347 and execution returns to step 308. Once all constructs 124 in resource script file 123 have been processed, then object oriented or other similar code is generated based on the defined objects and methods at step 348. Next, at step 350, the generated code is compiled to create or generate the graphical user interface plug-in 132. Once GUI plug-in 132 has been created, plug-in generation engine 130 registers plug-in 132 with registry 121 of the Windows-based operating system at step 352, where example method 300 ends.

Although FIG. 3 illustrates one example of a method 300 for generating one or more GUI plug-ins 132 based on a resource script file 123 various changes may be made to FIG. 3. For example, computer 100 may use any other type of construct 124 and generate GUI plug-in 132 written in any suitable language. Also, while FIG. 3 illustrates plug-in generation engine 130 storing GUI plug-ins 132 in memory 120, plug-in generation engine 130 could communicate some or all to network 110 via interface 115.

While this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for generating a web-enabled graphical user interface (GUI) plug-in comprising:

loading a resource script file for a software application, the resource script file comprising one or more first instructions for generating a GUI of the software application in a particular operating system, the resource script file, when processed by the particular operating system, generates the GUI, wherein the one or more first instructions and the GUI are specific to the particular operating system;

parsing the resource script file into one or more graphical constructs, wherein each graphical construct defines a single graphical object for the GUI web-enabled;

for each of the one or more graphical constructs:
   determining a construct type for the graphical construct,
   determining one or more properties of the graphical construct based on the determined construct type, and
   defining an object for the graphical construct based on the determined construct type;

automatically generating one or more second instructions based at least in part on the defined one or more objects, wherein the one or more second instructions are not specific to the particular operating system; and generating at least one GUI plug-in based, at least in part, on the one or more second instructions, wherein the at least one GUI plug-in is operable when executed to present at least a portion of the GUI in a format that is not specific to the particular operating system.

2. The method of claim 1, wherein the construct type for each of the one or more graphical constructs includes one of:
   a tree item;
   a tabbed dialog;
   a property sheet;
   a inclusion page; or
   a HyperText Markup Language (HTML) viewer.

3. The method of claim 2, wherein when the construct type for at least one of the one or more graphical constructs is a tree item, the one or more properties include one or more of:
   expandable;
   display property sheet;
   copy;
   rename;
   delete;
   drag; or
   drop.

4. The method of claim 1, wherein the one or more second instructions comprise JAVA code.

5. The method of claim 1, wherein the one or more second instructions are comprise C++ code.

6. The method of claim 1, further comprising registering the at least one GUI plug-in with a registry of a windowed operating system.

7. The method of claim 1, wherein the format comprises a nonspecific format operable to be executed on non-Windowed operating systems.

8. The method of claim 2, wherein when the construct type for at least one of the one or more graphical constructs is a tree item, and wherein defining the object for the at least one graphical construct further comprises:
   loading a root item for the at least one graphical construct located in the resource script file; and
   generating a tree item object based on the root item, the tree item object comprising the highest node in a hierarchy of tree item objects.

9. A computer readable storage medium storing computer executable instructions for generating a web-enabled graphical user interface (GUI) plug-in, the instructions operable when executed to:
   load a resource script file for a software application, the resource script file comprising one or more first instructions for generating a GUI of the software application in a particular operating system, the resource script file, when processed by the particular operating system, generates the GUI, wherein the one or more first instructions and the GUI are specific to the particular operating system;
   parse the resource script file into one or more graphical constructs, wherein each graphical construct defines a single graphical object for the GUI;
   for each of the one or more graphical constructs:
      determine a construct type for the graphical construct,
      determine one or more properties of the graphical construct based on the determined construct type, and
      define an object for the graphical construct based on the determined construct type;
   automatically generate one or more second instructions based at least in part on the defined one or more objects, wherein the one or more second instructions are not specific to the particular operating system; and
   generate at least one web-enabled GUI plug-in based, at least in part, on the one or more instructions, wherein the at least one GUI plug-in is operable when executed to present at least a portion of the GUI in a format that is not specific to the particular operating system.

10. The computer readable storage medium of claim 9, wherein the construct type for each of the one or more graphical constructs includes one of:
   a tree item;
   a tabbed dialog;
   a property sheet;
   a inclusion page; or
   a HyperText Markup Language (HTML) viewer.

11. The computer readable storage medium of claim 10, wherein when the construct type for at least one of the one or more graphical constructs is a tree item, the one or more properties include one or more of:
   expandable;
   display property sheet;
   copy;
   rename;
   delete;
   drag; or
   drop.

12. The computer readable storage medium of claim 9, wherein the one or more second instructions are written in JAVA code.

13. The computer readable storage medium of claim 9, wherein the one or more second instructions are written in C++ code.

14. The computer readable storage medium of claim 9 further operable to register the at least one GUI plug-in with a registry of a windowed operating system.

15. The computer readable storage medium of claim 9, the format comprising a nonspecific format operable to be executed on non-Windowed operating systems.

16. The computer readable storage medium of claim 10, wherein when the construct type for at least one of the one or more graphical constructs is a tree item, and wherein the executable instructions operable to define of the object for the graphical construct are further operable to:
   load a root item for the at least one graphical construct located in the resource script file; and
   generate a tree item object based on the root item, the tree item object comprising the highest node in a hierarchy of tree item objects.

17. A system for generating a web-enabled graphical user interface (GUI) plug-in comprising:
   memory operable to store a plurality of resource script files for a software application; and
   one or more processors collectively operable to:
      load a resource script file from among the plurality of resource script files, the resource script file comprising one or more first instructions for generating a GUI of the software application in a particular operating system and when processed by the particular operating system, generates a GUI, wherein the one or more first instructions and the GUI are specific to the particular operating system,
      parse the resource script file into one or more graphical constructs, wherein each graphical construct defines a single graphical object for the GUI;
   for each of the one or more graphical constructs:
      determine a construct type for the graphical constructs;
      determine one or more properties of the graphical construct based on the determined construct type, and
      define an object for the graphical construct based on the determined construct type;
      automatically generating one or more second instructions based at least in part on the defined one or more objects, wherein the one or more second instructions are not specific to the particular operating system, and
      generate at least one web-enabled GUI plug-in based, at least in part, on the one or more second instructions, wherein the at least one GUI plug-in is operable when executed to present at least a portion of the GUI in a format that is not specific to the particular operating system.

18. The system of claim 17, wherein the construct type for each of the one or more graphical constructs includes one of:
   a tree item;
   a tabbed dialog;
   a property sheet;
   a inclusion page; or
   a HyperText Markup Language (HTML) viewer.

19. The system of claim 18, wherein when the construct type for at least one of the one or more graphical constructs is a tree item, the one or more properties include one or more of:
   expandable;
   display property sheet;
   copy;
   rename;
   delete;
   drag; or
   drop.

20. The system of claim 17, wherein the one or more second instructions comprise JAVA code.

21. The system of claim 17, wherein the one or more second instructions comprise C++ code.

22. The system of claim 17, the processors further operable to register the at least one GUI plug-in with a registry of the particular operating system.

23. The system of claim 17, wherein the format comprises a nonspecific format operable to be executed on non-Windowed operating systems.

24. The system of claim 18, wherein when the construct type for at least one of the one or more graphical constructs is a tree item, the processors operable to define an object for the graphical construct are further operable to:
- load a root item for the at least one graphical construct located in the resource script file; and
- generate a tree item object based on the root item, the tree item object comprising the highest node in a hierarchy of tree item objects.

* * * * *